(12) United States Patent
Landa et al.

(10) Patent No.: US 10,634,120 B2
(45) Date of Patent: Apr. 28, 2020

(54) SYSTEM AND METHOD FOR CONTROLLING THRUST AND/OR TOWER LOADS OF A WIND TURBINE

(71) Applicant: General Electric Company, Schenectady, NY (US)

(72) Inventors: Bernard Landa, Clifton Park, NY (US); Darren John Danielsen, Simpsonville, SC (US); Collin McKee Sheppard, Greenville, SC (US); Nikolina Kristeva, Greenville, SC (US); Samuel Bryan Shartzer, Greenville, SC (US); Pranav Agarwal, Fremont, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/038,421

(22) Filed: Jul. 18, 2018

(65) Prior Publication Data

US 2020/0025174 A1 Jan. 23, 2020

(51) Int. Cl.
*F03D 7/04* (2006.01)
*F03D 80/80* (2016.01)
(Continued)

(52) U.S. Cl.
CPC ............. *F03D 7/045* (2013.01); *F03D 17/00* (2016.05); *F03D 80/80* (2016.05); *F03D 7/0204* (2013.01); *F03D 7/028* (2013.01); *F03D 7/0224* (2013.01); *F03D 7/0276* (2013.01); *F05B 2220/30* (2013.01); *F05B 2240/912* (2013.01);
(Continued)

(58) Field of Classification Search
CPC .......... F03D 7/00; F03D 7/0204; F03D 7/022; F03D 7/045
See application file for complete search history.

(56) References Cited

U.S. PATENT DOCUMENTS 8,155,920 B2 4/2012 Egedal
2009/0263245 A1* 10/2009 Shi ........................... F03D 7/02
416/43

(Continued)

FOREIGN PATENT DOCUMENTS

DE 10 2016 117191 A1 3/2018
EP 2063110 B1 8/2015
WO WO 2017/174090 A1 10/2017

OTHER PUBLICATIONS

Extended European Search Report, dated Nov. 27, 2019.

*Primary Examiner* — Mark A Connolly
(74) *Attorney, Agent, or Firm* — Dority & Manning, P.A.

(57) ABSTRACT

A method for controlling loads of a wind turbine includes receiving sensor signals from one or more sensors being indicative of a movement of a nacelle of the wind turbine from a reference point. More particularly, the movement corresponds, at least, to a tilt and/or a displacement of the wind turbine tower and/or nacelle. The method also includes generating a deflection profile of the tower along its overall length from a bottom end to a top end thereof based on the sensor signals. Further, the method includes determining at least one of a thrust or a tower load of the wind turbine from the deflection profile. In addition, the method includes implementing a control action for the wind turbine based on the thrust and/or the tower load.

18 Claims, 6 Drawing Sheets

(51) Int. Cl.
*F03D 17/00* (2016.01)
*F03D 7/02* (2006.01)

(52) U.S. Cl.
CPC ....... *F05B 2260/70* (2013.01); *F05B 2260/83* (2013.01); *F05B 2260/84* (2013.01); *F05B 2270/10* (2013.01); *F05B 2270/331* (2013.01); *F05B 2270/337* (2013.01); *F05B 2270/402* (2013.01); *F05B 2270/802* (2013.01); *F05B 2270/804* (2013.01); *F05B 2270/807* (2013.01); *F05B 2270/808* (2013.01); *G05B 2219/2619* (2013.01); *G05B 2219/2639* (2013.01)

(56) References Cited

U.S. PATENT DOCUMENTS

| | | | |
|---|---|---|---|
| 2010/0133827 A1 | 6/2010 | Huang et al. | |
| 2010/0140940 A1* | 6/2010 | Kammer | F03D 7/0224 290/44 |
| 2013/0287568 A1* | 10/2013 | Miranda | F03D 7/0224 416/1 |
| 2014/0003936 A1* | 1/2014 | Agarwal | F03D 7/02 416/1 |
| 2014/0241878 A1* | 8/2014 | Herrig | F03D 7/0224 416/1 |
| 2014/0328678 A1* | 11/2014 | Guadayol Roig | F03D 7/0292 416/1 |
| 2016/0222946 A1 | 8/2016 | Krings | |
| 2017/0306926 A1 | 10/2017 | Deshpande et al. | |

* cited by examiner

SYSTEM AND METHOD FOR CONTROLLING THRUST AND/OR TOWER LOADS OF A WIND TURBINE

FIELD

The present invention relates to generally to wind turbines, and more particularly, to a system and method for controlling thrust and/or tower loads of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Like most dynamic systems, wind turbines are subject to loads that may detrimentally impact the operation and/or structural integrity of the wind turbine. For conventional wind turbines, it can be a challenge to accurately measure the loads on the tower from aerodynamic thrust and other dynamics occurring in the wind turbine tower over the life of a wind turbine at low cost.

By better understanding the loads on the tower and aerodynamic thrust, the turbine controls can more optimally control pitch, power, life and/or speed of the turbine to maximize annual energy production (AEP) while still maintaining the turbine life and/or safety.

In view of the aforementioned, there is a need for an improved system and method for determining and controlling thrust and/or tower loads of the wind turbine.

BRIEF DESCRIPTION

Aspects and advantages of the invention will be set forth in part in the following description, or may be obvious from the description, or may be learned through practice of the invention.

In one aspect, the present disclosure is directed to a method for controlling loads (such as extreme loads and/or fatigue loads) of a wind turbine. The wind turbine has a nacelle mounted atop the tower. The tower defines an overall length extending from a bottom end to a top end. The method includes receiving, via a controller, sensor signals from one or more sensors being indicative of a movement of at least one of the nacelle or the tower from a reference point. More particularly, the movement may correspond, at least, to a tilt and/or a displacement of the tower or the nacelle. The method also includes generating, via the controller, a deflection profile of the tower along its overall length from the bottom end to the top end based on the sensor signals. Further, the method includes determining, via the controller, at least one of a thrust or a tower load of the wind turbine from the deflection profile. In addition, the method includes implementing, via the controller, a control action for the wind turbine based on the thrust and/or the tower load.

In one embodiment, the sensor(s) may include any suitable type of sensor, including but not limited to a smart sensor, an inclinometer, gyroscope, an accelerometer, a global positioning sensor (GPS) with real-time kinematics, an ultra-wideband (UWB) sensor, a laser sensor, optical sensor, radio sensor, or combinations thereof. In another embodiment, the sensor(s) are installed on or within at least one of the top portion of the tower, the nacelle, a rotor of the wind turbine, and/or a hub of the wind turbine. In several embodiments, the movement of the tower and/or the nacelle as detected by the sensor(s) may also include velocity and/or acceleration.

In another embodiment, the method may include calibrating the one or more sensors. In such embodiments, the method may include implementing a nacelle yaw sweep during low/no wind conditions and generating a calibration curve to factor out any static physical tower top and/or nacelle tilt due to not being constructed perfectly square. In one embodiment, the calibration step may also occur passively during operation when low/no wind conditions are detected at various passively occurring yaw positions.

In further embodiments, the step of determining the thrust and/or the tower load of the wind turbine from the deflection profile may include evaluating the deflection profile in a time domain and a frequency domain. As such, evaluating the deflection profile in the time domain allows for determination of translation and rotation of the nacelle tilt, whereas evaluating the deflection profile in the frequency domain allows for determination of sources of energy by structural resonant components. In such embodiments, the method may further include implementing the control action for the wind turbine if a predetermined excitation exists in in the frequency domain to counter the predetermined excitation.

In additional embodiments, the step of determining the thrust and/or the tower load of the wind turbine from the deflection profile may include comparing non-linearity in the deflection profile with a predetermined threshold. In such embodiments, the method may also include implementing the control action for the wind turbine if the non-linearity exceeds the predetermined threshold.

In several embodiments, the step of determining the thrust and/or the tower load of the wind turbine from the deflection profile may include inputting the sensor signals into a computer model that correlates the tilt and/or the displacement of the tower and/or the nacelle to the thrust and/or the tower load. For example, in one embodiment, the computer model may be based on any suitable model, including but not limited to Euler-Bernoulli beam theory, a physics-based model, and/or an empirical model. In such embodiments, the method may further include determining at least one of the thrust or the tower load of the wind turbine via the correlation.

In another embodiment, the method may include receiving the sensor signals from one or more sensors in real-time. In addition, the method may include tracking the thrust and/or the tower load over a predetermined time period and storing the tracked thrust and/or tower load in a memory device of the controller. Thus, the method may further include implementing the control action for the wind turbine based on the tracked thrust and/or tower load (as well as the real-time thrust and/or tower loads). Such tracking may include, for example, fatigue load tracking over the life of the wind turbine.

In yet another embodiment, the method may include implementing the control action for the wind turbine based on the thrust and/or the tower load and at least one of time of day or a power demand of the power grid. In such embodiments, the method of the present disclosure is configured to take advantage of lower power prices during non-peak power demand time frames (e.g. at night) versus time frames with higher power prices (e.g. during the day).

In particular embodiments, the step of implementing the control action for the wind turbine based on the thrust and/or the tower load may include altering a pitch of one or more rotor blades of the wind turbine, modifying a power output of the wind turbine, modifying a speed of the wind turbine, and/or yawing the nacelle of the wind turbine.

In another aspect, the present disclosure is directed to a system for controlling loads of a wind turbine. The wind turbine has a nacelle mounted atop the tower. The tower defines an overall length extending from a bottom end to a top end. The system includes one or more sensors configured to generate sensor signals being indicative of a movement of the tower and/or nacelle from a reference point and a controller communicatively coupled with the one or more sensors. More particularly, the movement may correspond to, at least, a tilt and/or a displacement of the tower and/or nacelle. The controller is configured to perform one or more operations, including but not limited to receiving the sensor signals from one or more sensors, generating a deflection profile of the tower along its overall length from the bottom end to the top end based on the sensor signals, determining at least one of a thrust or a tower load of the wind turbine from the deflection profile, and implementing a control action for the wind turbine based on the thrust and/or the tower load. It should be understood that the system may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
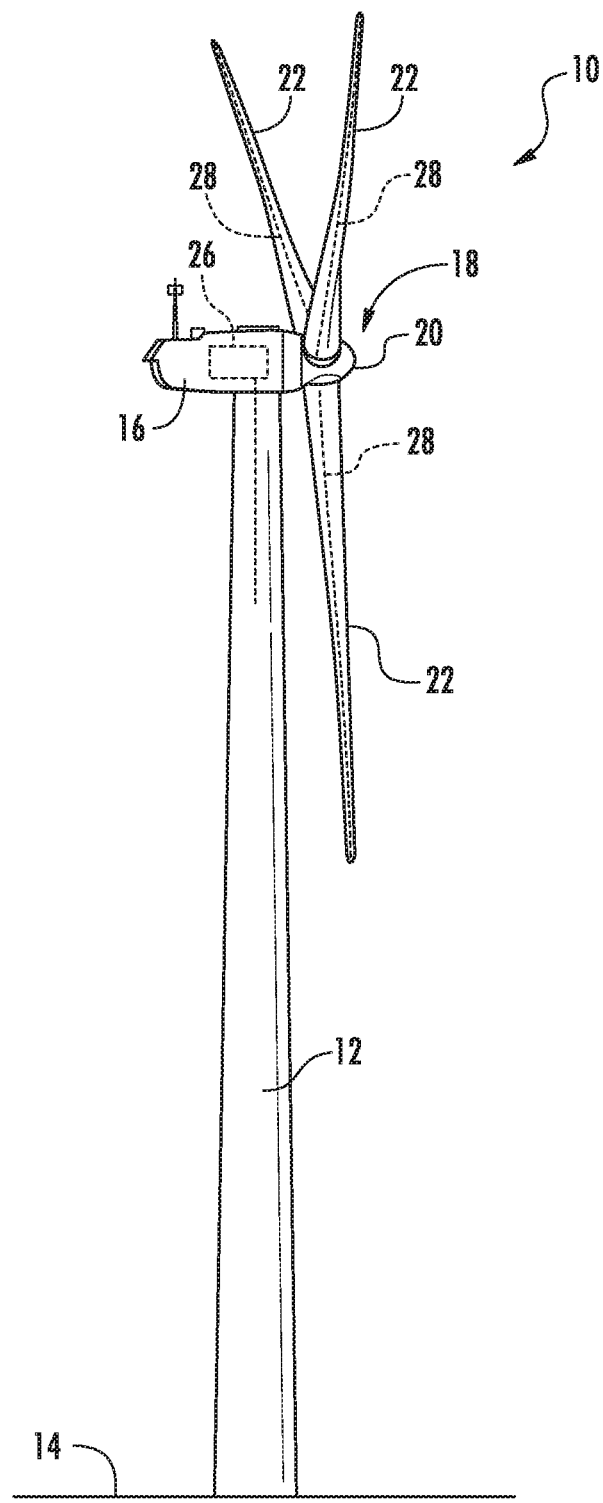
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for controlling loads of a wind turbine. The method includes receiving sensor signals from one or more sensors that are indicative of a tilt and/or a displacement of the tower or nacelle. In addition, the system may also include multiple sensors or a network of sensors installed on or in a tower structure (or the nacelle) when multiple materials or non-symmetrical geometrical configurations are used to measure irregular deflection or inclination patterns. The method also includes generating a deflection profile of the tower along its overall length based on the sensor signals. Further, the method includes determining thrust and/or tower loads (i.e. extreme and fatigue loads) of the wind turbine from the deflection profile. Since the tower responds similar to a simple beam, a point load (such as aerodynamic thrust) acting on the top of the tower generates an expected tower top displacement and tilt. This trend can be modeled with several methods, the most simple being an Euler beam theory. Still other modeling techniques may be used, such as physics-based models as well as empirical models. Since a tilt-to-load correlation exists, an inclination or displacement sensor can be placed at the tower top (or at various locations along the tower length and/or circumference) to estimate tower loads and aerodynamic thrust. Further, the sensors can also be used to detect the mode shape of the deflection in bending and/or torsion directions. Thus, the method may also include implementing a control action for the wind turbine based on the thrust and/or the tower load(s).

The response to a dynamic loading condition can be evaluated in both the time and frequency domains. Measurement of inclination in the time domain allows for determination of translation and rotation. Evaluating the data in the frequency domain allows for determining sources of energy by structural resonant components and opportunity to influence through active cancellation techniques.

As such, the present disclosure provides many advantages not present in the prior art. For example, by better understanding the loads on the tower and aerodynamic thrust, the turbine controls can more optimally control pitch, power, life and speed to maximize annual energy production (AEP), while still maintaining life and safety. More particularly, in one embodiment, fatigue loads of the wind turbine can be controlled to maximize AEP. For example, in certain instances, the control method of the present disclosure may include purposely run the wind turbine at an increased fatigue level to take advantage of improved power purchase rates, and then operated at a decelerated fatigue value when power purchase rates are low to manage over the design life of the wind turbine. As such, the present disclosure has an advantage of increasing power during time periods of high purchase pricing (which results in higher fatigue) to be offset by lowering power during lower purchase prices (to reduce fatigue) to manage the total fatigue life over the life of the wind turbine.

Additionally, the sensors of the present disclosure can also be used to enhance model-based controls as well as add diagnostic capability. Moreover, structural components are life limited by high and low cycle loading. Thus, incorporating sensor feedback that allows for estimation and/or measurement of one or many tower sections enables a controlling device to track cycles and/or actively influence the amplitude of oscillations during low-cycle loading events, thereby prolonging the life of the structure and allowing for design optimization.

Referring now to the drawings, FIG. 1 illustrates a perspective view of one embodiment of a wind turbine 10 according to conventional construction. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotation of the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
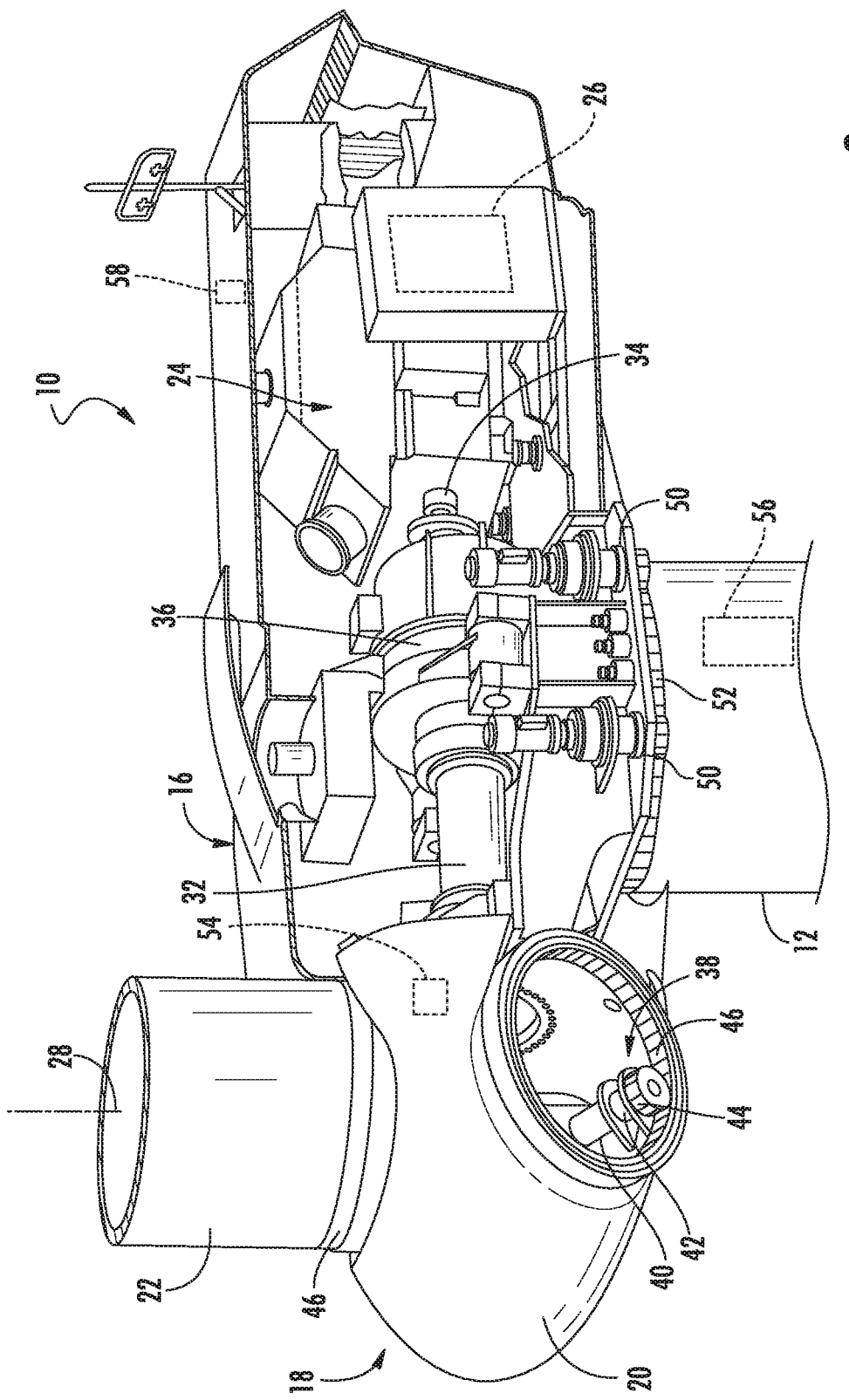
FIG. 2 illustrates a detailed, perspective view of one embodiment of a nacelle of a wind turbine according to the present disclosure.

Referring now to FIG. 2, the wind turbine 10 as described herein may also include a controller 26 configured to control the various components of the turbine 10. More specifically, as shown, a simplified, internal view of one embodiment of the nacelle 16 of the wind turbine 10 shown in FIG. 1 is depicted, particularly illustrating example components that may be controlled via the controller 26. As shown, the generator 24 may be disposed within the nacelle 16 and may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 30 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 30.

Each rotor blade 22 may also include a pitch drive mechanism 38 configured to rotate each rotor blade 22 about its pitch axis 28. Further, each pitch adjustment mechanism 38 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 50 communicatively coupled to the controller 26, with each yaw drive mechanism(s) 50 being configured to change the angle of the nacelle 16 relative to the wind (e.g., by engaging a yaw bearing 52 of the wind turbine 10).

Figure 5:
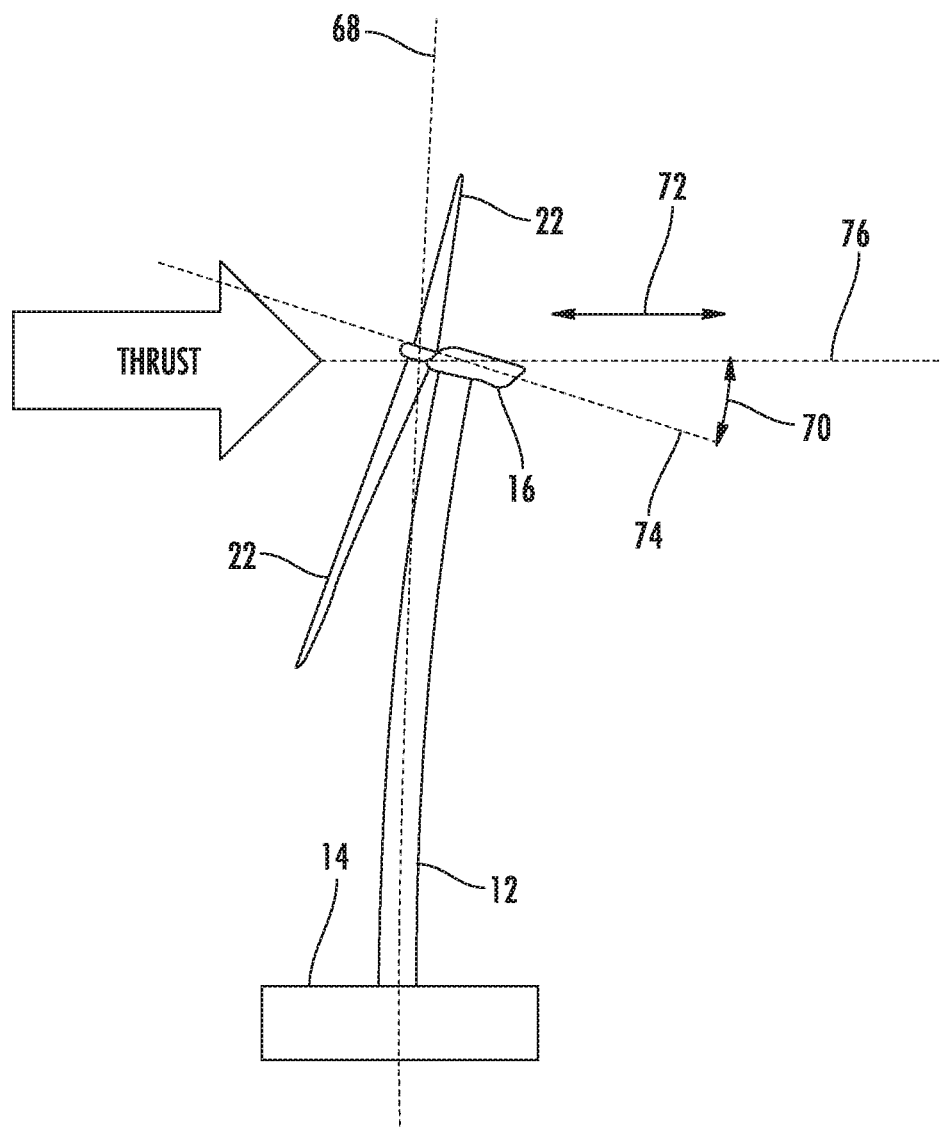
FIG. 5 illustrates a perspective view of one embodiment of a wind turbine according to the present disclosure, particularly illustrating tilt and displacement of the nacelle and tower from a reference point.

In addition, as shown, the wind turbine 10 may also include one or more sensors (e.g. sensors 54, 56, 58) for generating various sensor signals indicative of tower and/or nacelle movement from a reference point 68 (FIG. 5), e.g. a center line of the wind turbine 10. For example, as shown in FIG. 5, the movement of the tower 12 and/or the nacelle 16 may include a tilt 70 and/or a displacement 72 of the tower 12 and/or the nacelle 16. In several embodiments, the movement of the tower 12 and/or the nacelle 16 as detected by the sensor(s) may also include velocity and/or acceleration.

Thus, as shown, the sensor(s) may be installed on or within at least one of the top portion of the tower 12, along a length of the tower 12, around at least a portion of a circumference of the tower 12, the nacelle 16, the rotor 18, and/or the hub 20. Of course, the wind turbine 10 may further include various other suitable sensors for measuring any other suitable loading and/or operating conditions of the wind turbine 10. For example, in one embodiment, the tower 12 may include at least two sensors, e.g. a first sensor at the top portion of the tower 12 and a second sensor at a mid-portion of the tower 12. Such sensors are configured to provide first and second mode tower state determination. More specifically, the first and second sensors are configured to measure first and second mode bending state to estimate loads across the tower 12. In still another embodiment, when tracking fatigue life, a single nacelle sensor may be used. In this situation, tower damage per tower section (e.g. in the horizontal plane/wind rose tracking) can be calculated by using the measured nacelle yaw position.

In addition, the sensors 54, 56, 58 described herein may include any suitable sensors known in the art. For example, in certain embodiments, the sensors may include any suitable type of sensor, including but not limited to a smart sensor, an inclinometer, gyroscope, an accelerometer, a global positioning sensor (GPS) with real-time kinematics, an ultra-wideband (UWB) sensor, a laser sensor, an optical sensor, a radio sensor, or combinations thereof. As used herein, a smart sensor generally refers to a sensing device that has wireless and/or wired data transmission. In addition, the sensors 54, 56, 58 described herein may be able to self-power through energy harvesting methods typical for low power consumption sensor systems. In such embodiments, the sensor data transmission may be possible via wired or RF transmission. In further embodiments, energy for powering the sensor(s) 54, 56, 58 may be provided via wiring or self-generation (e.g. energy harvesting) through various methods, including but not limited to mechanical motion, solar power, thermal differential, electrical induction, and/or similar.

As discussed, the controller 26 described herein is configured to perform intelligent data management. In further embodiments, the sensor(s) 54, 56, 58 of the present disclosure may also be configured to perform the data management locally or via a sensor network. In such embodiments, the various control actions described herein allows for decentralized control using intelligent data management. For example, in one embodiment, the turbine controller 26 may command a turbine response and each individual sensor may be its own controller and may send only actionable information to the controller 26 without continuous output.

Figure 3:
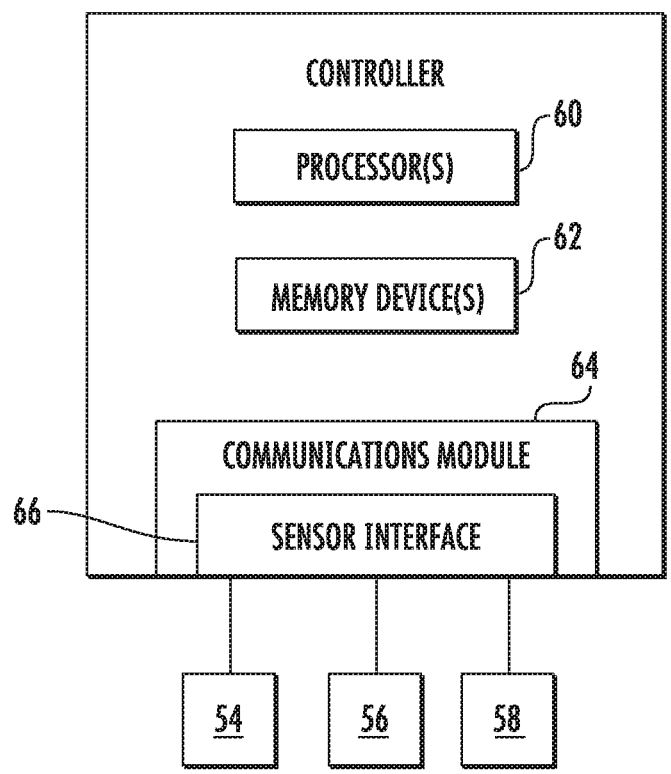
FIG. 3 illustrates a block diagram of one embodiment of suitable components that may be included in a controller of the wind turbine.

Referring now to FIG. 3, there is illustrated a block diagram of one embodiment of suitable components that may be included within the controller 26 in accordance with aspects of the present subject matter. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from the sensors) to be converted into signals that can be understood and processed by the processors 60. It should be appreciated that the sensors as described herein may be communicatively coupled to the communications module 64 using any suitable means. For example, the sensors may be coupled to the sensor interface 66 via a wired connection. However, in alternative embodiments, the sensors may be coupled to the sensor interface 66 via a wireless connection, such as by using any suitable wireless communications protocol known in the art.

Figure 4:
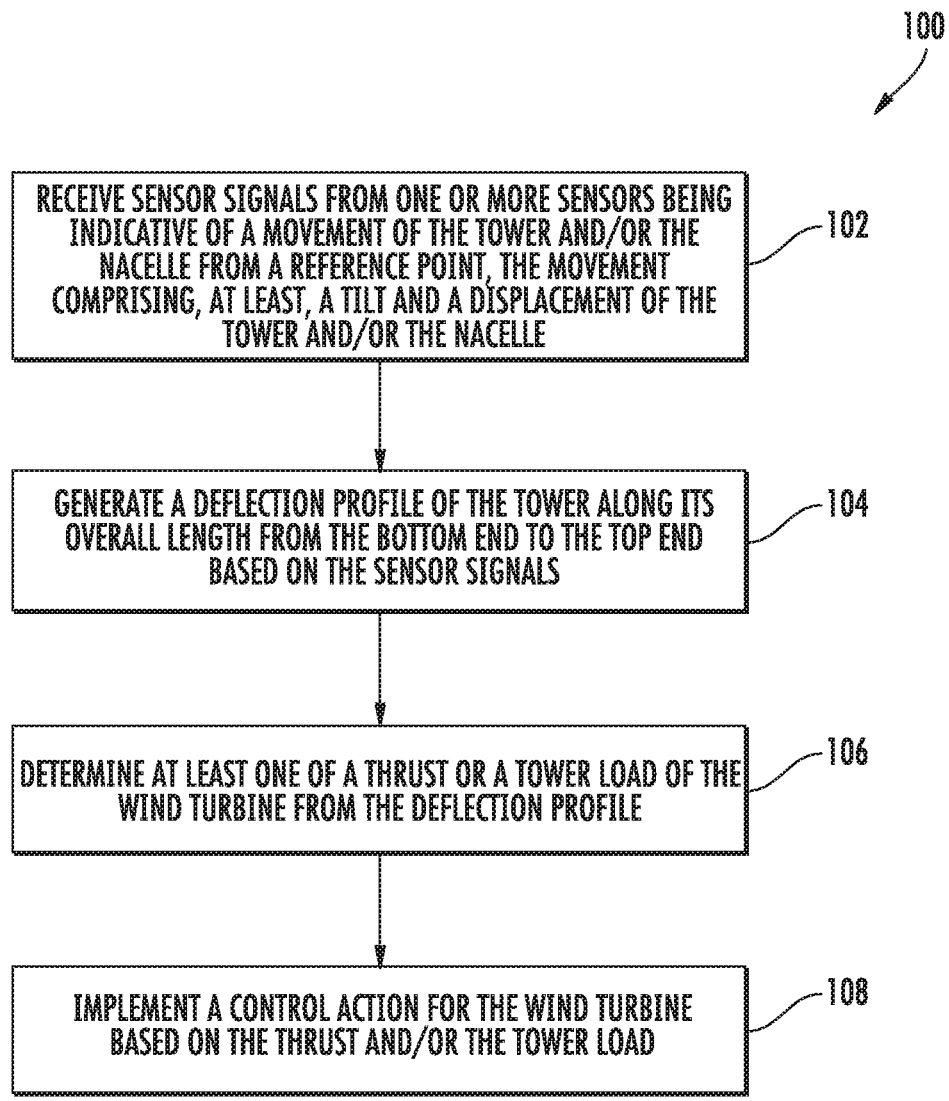
FIG. 4 illustrates a flow diagram of one embodiment of a method for controlling loads of the wind turbine according to the present disclosure.

Referring now to FIG. 4, a flow diagram of one embodiment of one embodiment of a method 100 for controlling loads of a wind turbine 10 is illustrated. In general, the method 100 will be described herein with reference to the wind turbine 10 shown in FIGS. 1 and 2, as well as the various controller components shown in FIG. 3. However, it should be appreciated that the disclosed method 100 may be implemented with wind turbines having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (102), the method 100 may include receiving sensor signals from one or more sensors being indicative of a movement of the tower 12 and/or the nacelle 16 from a reference point 68. More particularly, as shown in FIG. 5, the movement may correspond to a tilt 70 and a displacement 72 of the tower 12 and/or the nacelle 16. For example, as shown, the tilt 70 or inclination of the tower 12 and/or the nacelle 16 generally refers to the sloping movement of the tower 12 and/or the nacelle 16 from the reference point 68 to an inclined or sloped position 74. Further, as shown, the displacement 72 of the tower 12 and/or the nacelle 16 generally refers to fore and aft movement of the tower 12 and/or the nacelle 16 along a horizontal plane 76 from the reference point 68.

In additional embodiments, the sensor(s) described herein may be arranged to also measure tower twist and thus torque (e.g. using nacelle rotational displacement and inclination sensor arrays) to measure wind direction changes, tower buckling threshold, and/or wind veer. In further embodiments, the method 100 may include receiving the sensor signals from the sensor(s) 54, 56, 58 in real-time.

Figure 6:
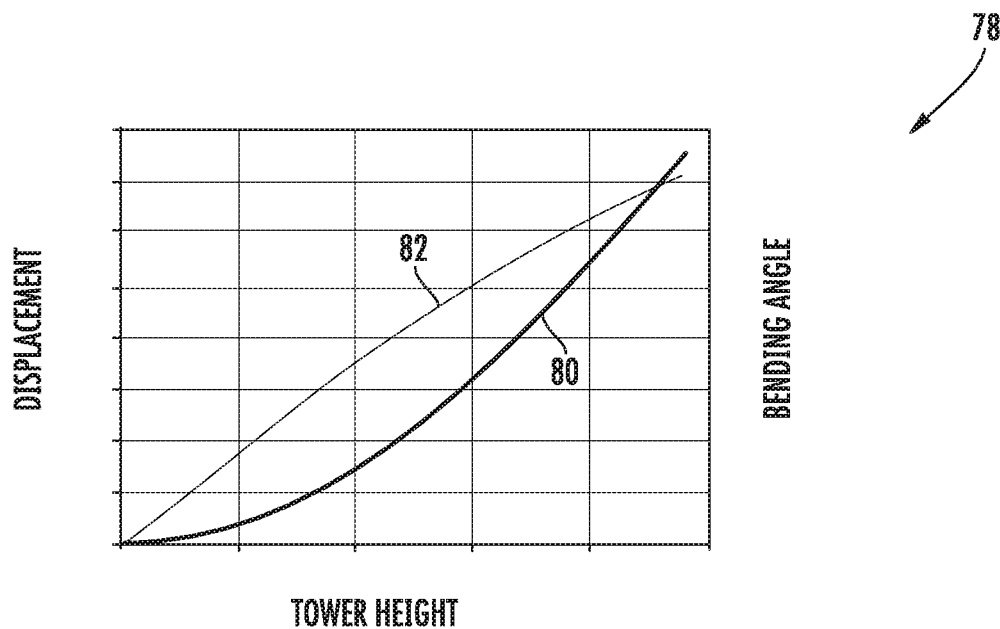
FIG. 6 illustrates a graph of one embodiment a deflection profile that correlates tower height (x-axis) with displacement and bending angle (y-axis) according to the present disclosure, particularly illustrating a tower the inclination and displacement of a tower that is being subjected to a thrust load.

Referring back to FIG. 4, at (104), the method 100 may include generating a deflection profile 78 (FIG. 6) of the tower along its overall length from the bottom end to the top end based on the sensor signals. In certain embodiments, the deflection profile 78 can be in bending and/or torsion and may also consider various deflection modes. For example, as shown in FIG. 6, the controller 26 may be configured to generate the deflection profile 78 by correlating tower height (x-axis) with displacement and bending angle (y-axis). Further, as shown, the displacement of the tower 12, which is subjected to a thrust load, is represented by curve 80, whereas the bending angle of the tower 12 is represented by curve 82. Moreover, as shown in the illustrated embodiment, as the tower height increases, the displacement 80 increases as well. In addition, as shown, as the tower height increases, the bending angle 82 increases up to a point and then starts to taper off. Thus, as shown, the maximum inclination angle and displacement occurring at the tower top. For comparison, the displacement and inclination for a tower that is not experiencing any thrust loads would both be zero (i.e. straight horizontal lines beginning at zero) on the graph.

Figure 7:
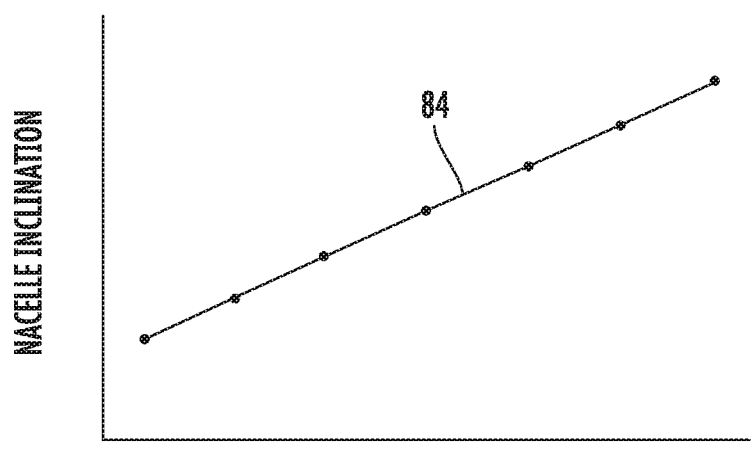
FIG. 7 illustrates a graph of one embodiment a graph that correlates the tower inclination (y-axis) with a thrust load (x-axis) according to the present disclosure.

As shown in FIG. 4, at (106), the method 100 may include determining the thrust and/or tower loads of the wind turbine 10 from the deflection profile 78. More specifically, the controller 26 may be configured to determine the thrust and/or the tower load of the wind turbine 10 from the deflection profile 78 by inputting the sensor signals into a computer model stored therein that correlates the tilt and/or the displacement of the tower 12 and/or the nacelle 16 to the thrust and/or the tower load. For example, as shown in FIG. 7, the computer model may be based on at least one of Euler-Bernoulli beam theory, a physics-based model, or an empirical model. In such embodiments, as shown, the controller 26 may be configured to correlate (as illustrated via curve 84) the nacelle inclination (y-axis) with a thrust load (x-axis). More particularly, as shown in the illustrated graph, as the tower inclination increases, the thrust load may also increase. In additional embodiments, the controller 26 may be configured to determine the thrust and/or the tower load of the wind turbine 10 from the deflection profile by comparing non-linearity in the deflection profile 78 (i.e. in either or both of the displacement 80 or the bending angle 82) with a predetermined threshold.

In additional embodiments, the controller 26 may be configured to determine the thrust and/or the tower load of the wind turbine 10 from the deflection profile 78 by evaluating the deflection profile 78 in a time domain and/or a frequency domain. As such, evaluating the deflection profile 78 in the time domain allows for determination of translation and rotation of the tilt of the tower 12 and/or the nacelle 16, whereas evaluating the deflection profile 78 in the frequency domain allows for determination of sources of energy by structural resonant components.

Referring back to FIG. 4, at (108), the method 100 may include implementing a control action for the wind turbine 10 based on the thrust and/or the tower load. More specifically, in particular embodiments, the control action for the wind turbine 10 may include altering a pitch of one or more rotor blades of the wind turbine, modifying a power output of the wind turbine, modifying a speed of the wind turbine, and/or yawing the nacelle of the wind turbine 10.

In another embodiment, the method 100 may include implementing the control action for the wind turbine 10 if a predetermined excitation exists in in the frequency domain of the deflection profile 78 so as to counter the predetermined excitation. In another embodiment, the method 100 may also include implementing the control action for the wind turbine 10 if the non-linearity in the deflection profile 78 exceeds the predetermined threshold.

In additional embodiments, the method 100 may also include tracking the thrust and/or the tower load over a predetermined time period and storing the tracked thrust and/or tower load in the memory device 62 of the controller 26. Thus, the method 100 may further include implementing the control action for the wind turbine 10 based on the tracked thrust and/or tower load (as well as the real-time thrust and/or tower loads).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling loads of a wind turbine connected to a power grid, the wind turbine having a nacelle mounted atop the tower, the tower defining an overall length extending from a bottom end to a top end, the method comprising:
   receiving, via a controller, sensor signals from one or more sensors being indicative of a movement of the tower and/or the nacelle from a reference point, the movement comprising, at least, a tilt and/or a displacement of the tower and/or the nacelle;
   generating, via the controller, a deflection profile of the tower along its overall length from the bottom end to the top end based on the sensor signals;
   determining, via the controller, at least one of a thrust or a tower load of the wind turbine from the deflection profile, wherein determining at least one of the thrust or the tower load of the wind turbine from the deflection profile further comprises evaluating the deflection profile in a time domain and a frequency domain, wherein evaluating the deflection profile in the time domain allows for determination of translation and rotation of the tilt and evaluating the deflection profile in the frequency domain allows for determination of sources of energy by structural resonant components; and,
   implementing, via the controller, a control action for the wind turbine based on the thrust and/or the tower load.

2. The method of claim 1, wherein the one or more sensors are installed on or within at least one of the top portion of the tower, along a length of the tower, around at least a portion of a circumference of the tower, the nacelle, a rotor of the wind turbine, or a hub of the wind turbine.

3. The method of claim 1, further comprising calibrating the one or more sensors.

4. The method of claim 1, wherein the movement further comprises at least one of velocity or acceleration.

5. The method of claim 1, further comprising implementing the control action for the wind turbine if a predetermined excitation exists in in the frequency domain to counter the predetermined excitation.

6. The method of claim 1, wherein determining at least one of the thrust or the tower load of the wind turbine from the deflection profile further comprises comparing non-linearity in the deflection profile with a predetermined threshold.

7. The method of claim 6, further comprising implementing the control action for the wind turbine if the non-linearity exceeds the predetermined threshold.

8. The method of claim 1, wherein determining at least one of the thrust or the tower load of the wind turbine from the deflection profile further comprises:
   inputting the sensor signals into a computer model that correlates the tilt and the displacement to the thrust and/or the tower load, the computer model being based on at least one of Euler-Bernoulli beam theory, a physics-based model, or an empirical model; and,
   determining at least one of the thrust or the tower load of the wind turbine via the correlation.

9. The method of claim 1, further comprising:
   tracking the thrust and/or the tower load over a predetermined time period;
   storing the tracked thrust and/or tower load in a memory device of the controller; and
   implementing the control action for the wind turbine based on the tracked thrust and/or tower load.

10. The method of claim 1, further comprising implementing the control action for the wind turbine based on the thrust and/or the tower load and at least one of time of day or a power demand of the power grid.

11. The method of claim 1, further comprising receiving the sensor signals from one or more sensors in real-time.

12. The method of claim 1, wherein implementing the control action for the wind turbine based on the thrust and/or the tower load further comprises at least one of altering a pitch of one or more rotor blades of the wind turbine, modifying a power output of the wind turbine, modifying a speed of the wind turbine, or yawing the nacelle of the wind turbine.

13. A system for controlling loads of a wind turbine, the wind turbine having a nacelle mounted atop the tower, the tower defining an overall length extending from a bottom end to a top end, the system comprising:
   one or more sensors configured to generate sensor signals being indicative of a movement of the wind turbine from a reference point, the movement comprising, at least, a tilt and a displacement of the tower and/or the nacelle;
   a controller communicatively coupled with the one or more sensors, the controller configured to perform one or more operations, the operations comprising:
      receiving the sensor signals from one or more sensors;
      generating a deflection profile of the tower along its overall length from the bottom end to the top end based on the sensor signals;
      evaluating the deflection profile in a time domain and a frequency domain, wherein evaluating the deflection profile in the time domain allows for determination of translation and rotation of the tilt and evaluating the deflection profile in the frequency domain allows for determination of sources of energy by structural resonant components;

determining at least one of a thrust or a tower load of the wind turbine from the deflection profile; and, implementing a control action for the wind turbine based on the thrust and/or the tower load.

14. The system of claim 13, wherein the one or more sensors further comprise at least one of a smart sensor, an inclinometer, gyroscope, an accelerometer, a global positioning sensor (GPS) with real-time kinematics, an ultra-wideband (UWB) sensor, a laser sensor, an optical sensor, a radio sensor, or combinations thereof.

15. The system of claim 13, wherein the one or more sensors are installed on or within at least one of the top portion of the tower, along a length of the tower, around at least a portion of a circumference of the tower, the nacelle, a rotor of the wind turbine, or a hub of the wind turbine.

16. The system of claim 13, wherein the one or more operations further comprise:

comparing non-linearity in the deflection profile with a predetermined threshold; and, implementing the control action for the wind turbine if the non-linearity exceeds the predetermined threshold.

17. The system of claim 13, wherein determining at least one of the thrust or the tower load of the wind turbine from the deflection profile further comprises:

inputting the sensor signals into a computer model that correlates the tilt and the displacement to the thrust and/or the tower load, the computer model being based on at least one of Euler-Bernoulli beam theory, a physics-based model, or an empirical model; and, determining at least one of the thrust or the tower load of the wind turbine via the correlation.

18. The system of claim 13, wherein the one or more operations further comprise:

tracking the thrust and/or the tower load over a predetermined time period;

storing the tracked thrust and/or tower load in a memory device of the controller; and, implementing the control action for the wind turbine based on the tracked thrust and/or tower load.

* * * * *